July 20, 1937.  E. WADELTON  2,087,419
LATCH MEANS FOR SCRAPER BOWLS
Filed March 21, 1936
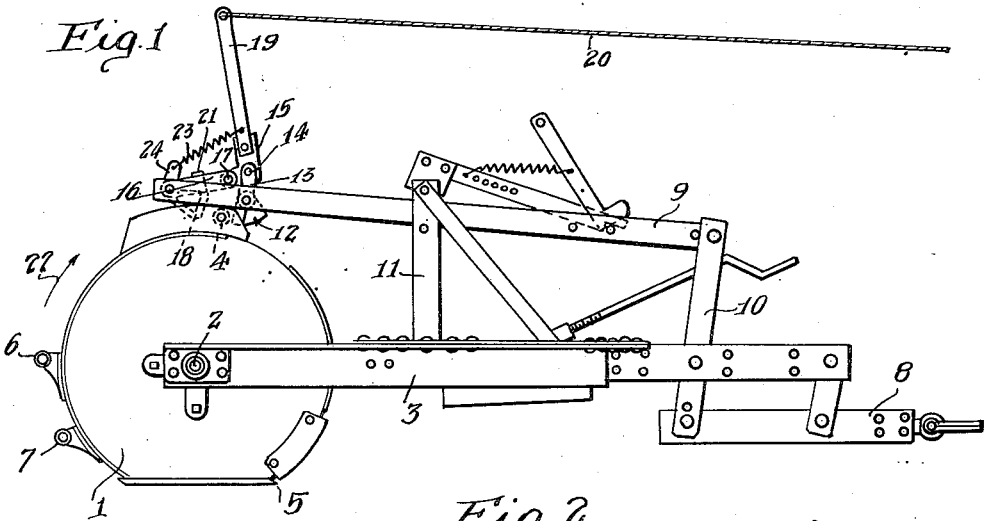
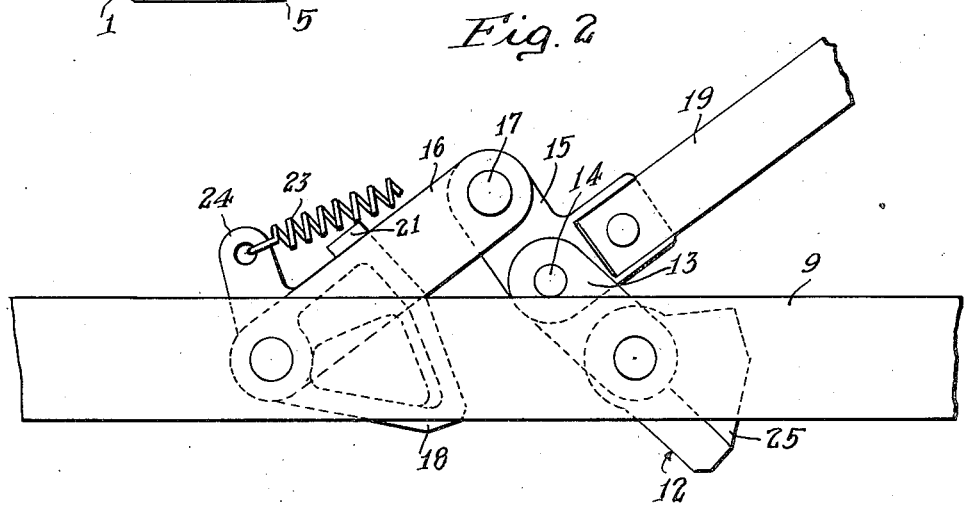
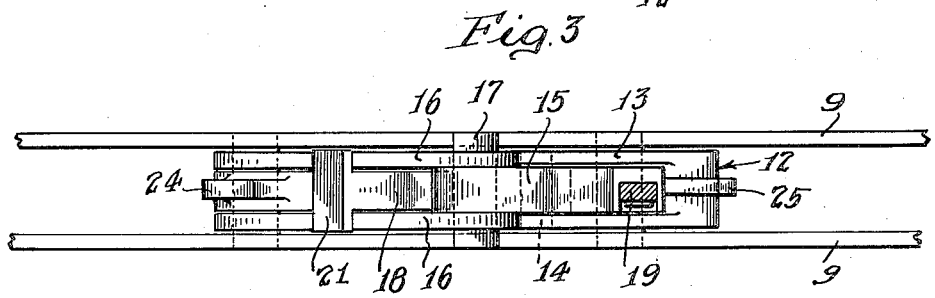
INVENTOR.
Edwin Wadelton
BY
Lyon & Lyon
ATTORNEYS Patented July 20, 1937

2,087,419

UNITED STATES PATENT OFFICE 2,087,419

LATCH MEANS FOR SCRAPER BOWLS

Edwin Wadelton, Los Angeles, Calif., assignor to Killefer Manufacturing Corporation, Ltd., Los Angeles, Calif., a corporation of California Application March 21, 1936, Serial No. 70,090

5 Claims. (Cl. 37—138)

This invention relates to scrapers, and more particularly to a latch means for maintaining the scraper bowl in the desired positions.

It is a particular object of this invention to provide a new and improved form of holding or latch means for maintaining the scraper bowl in any of the desired positions such as the cutting, spreading, or carrying positions.

Another object of this invention is to provide a holding means including a latch wherein there is provided a latch member which is so mounted and positioned that the force imposed against the latch member tending to move the latch member out of position is translated through a series of pivotal links in such a manner as to tend to force the latch member more positively into latching position.

Other objects and advantages of this invention it is believed will be apparent from the following detailed description of a preferred embodiment thereof as illustrated in the accompanying drawing.

In the drawing:

Figure 1 is a side elevation of a rotary earth scraper illustrating my invention.

Figure 2 is a detached enlarged elevation of the latch mechanism embodying my invention.

Figure 3 is a top plan view of the structure illustrated in Figure 2.

In the preferred embodiment of my invention as illustrated in the accompanying drawing, 1 indicates a scraper bowl which is of any suitable or desirable construction and which is pivotally mounted on trunnions 2 within a draft frame 3, all of which construction is well known in the art. The scraper bowl 1 is provided with stops for maintaining the scraper bowl in the desired position. A stop 4, carried by the scraper bowl, maintains the bowl in cutting position so that the cutting edge 5 is in position to pick up the soil. A stop 6 is positioned on the scraper bowl 1 in such position as to hold the scraper bowl 1 in spreading position so that the earth or soil picked up by the scraper bowl may be spread. A stop 7 is a carrying stop utilized for maintaining the bowl 1 in non-cutting or non-spreading position when it is desired to transport the scraper from point to point.

At its forward end the draft frame 3 is provided with a draft connection 8 by means of which the scraper may be connected to a tractor or other suitable draft means. Mounted upon the draft frame 3 is a holding bar 9, which holding bar 9 is at its forward end pivotally connected through a link 10 to the draft frame 3 and to the draft means 8. The holding bar 9 passes through a standard 11 mounted upon the draft frame 3.

In the particular embodiment of my invention herein illustrated, the holding bar 9 is positioned centrally of the bowl 1 as are the stops 4, 6, and 7.

My invention includes a latch member 12 which is pivotally connected between the pairs of bars forming the holding bar 9 and is provided with an upwardly extending arm 13 by means of which the latch member is pivotally connected at a pivot point 14 to a toggle 15. A double holding bar link 16 is pivotally connected to the holding bar 9 at one end, and at its opposite end is pivotally connected at the pivot 17 to the toggle 15. Carried upon the same pivot as supports the holding bar link 16 upon the holding bar 9 is a pivotally mounted holding latch 18.

Secured to the opposite arm of the toggle 15 is an actuating lever 19 which is provided with a flexible connecting rope or member 20 which extends forwardly to the tractor or draft implement. The pivot pin 17 extends outwardly to engage the upper surface of the two members forming the holding bar 9. The pivotally mounted holding latch 18 is provided with a stop 21 which is adapted to engage the upper surface of the holding bar link 16 so that normally the holding latch 18 swings under the influence of the spring 23 into position to be engaged by either of the stops 4, 6 or 7 to prevent the scraper bowl 1 from rotating backwards upon its trunnions 2 or in a direction opposed to the direction of rotation induced by the engagement of the cutting edge 5 with the soil as the scraper is moved forwardly. The stop 21 also provides a means by which the latch 18 may be rotated to a position to permit the scraper bowl to revolve freely when the scraper is backed and the lever 19 is pulled forwardly.

The holding latch 18 is pivotally mounted so that when the scraper bowl 1 is rotated in the direction indicated by the arrow 22 and the stops 4, 6 or 7 engage the holding latch 18 during such rotation, the holding latch 18 will swing out of the way to permit of such rotation.

In order to hold the latch elements normally in the position desired, a spring 23 is connected between the arm 24 of the holding latch 18 and the actuating lever 19.

The operation of the latch embodying my invention is: With the scraper in the position indicated in Figure 1 and traveling forwardly under the influence of the draft means, the tendency of the bowl 1 is to rotate in the direction of the arrow 22, and the stop 4 is in engagement with the latch member 12.

The link 16, toggle 15, and the arm 13 of the latch member 12 are so positioned, and under this condition of operation, the pivot 17 is in a position below a straight line projected through the pivot 14, and the point of pivotal connection of the link 16 of the holding bar 9. Thus, with a force exerted against the latch member 12 tending to swing the latch member 12 away from the stop 4, this force is transmitted through the toggle 15 in such a manner as to cause the pivot 17 to be further depressed against the upper surface of the holding bar 9, thereby locking the latch member 12 in latched position.

In order to release the latch member 12 to permit the scraper to roll over, the operator will pull forwardly upon the rope 20 causing the pivot 17 to pass to the other side of the line passed through the pivot 14, and the point of pivotal connection of the link 16 with the bar 9 thereby permitting the latch member 12 to swing freely away from the stop 4.

The latch member 12 is provided with a rib 25. The rib 25 is so formed that the stops 4, 6 and 7 will not foul or hang up on the stop 12 when the scraper is backed and the parts are moved to the position of Figure 2, and it is desired to have the scraper bowl revolve during backing thereof.

The slope of the lower surface of the rib 25 is such that as a stop 4, 6 or 7 comes in contact with it during backing, the said stop will ride under the rib 25, raising the holding bar 9 without stopping the rotation of the bowl.

Having fully described my invention, it is to be understood that I do not wish to be limited to the details herein set forth, but my invention is of the full scope of the appended claims.

I claim:

1. In a device of the class described, the combination of a draft frame, a revolvable bowl journaled in the frame, a holding bar, position stops carried by the bowl, means for supporting the holding bar on the draft frame, a latch member pivotally supported on the holding bar in position to be engaged by the position stops, a toggle link connected with the latch member, a holding bar link pivotally connected at one end with the holding bar, and an extended pivot pin connecting the other end of the holding bar link with the toggle link in position to engage the holding bar to maintain the latch member in holding position.

2. In a device of the class described, the combination of a draft frame, a revolvable bowl journaled in the frame, a holding bar, stops carried by the bowl, means on the frame for supporting the holding bar, a latch member pivotally supported on the holding bar in position to be engaged by the stops, a toggle link pivotally connected with the latch member, a holding bar link pivotally connected at one end with the holding bar and at the other end with the toggle link, an actuating arm secured to the toggle link, and a spring connected between the actuating arm and the holding bar.

3. In a device of the class described, the combination of a draft frame, a revolvable bowl journaled in the frame, a holding bar, stops carried by the bowl, means on the frame for supporting the holding bar, a latch member pivotally supported on the holding bar positioned to be engaged by the stops, a toggle link, means pivotally connecting the toggle link with the latch member, a holding bar link pivotally connected to the holding bar and to the toggle link, and an actuating arm secured to the toggle link.

4. In a device of the class described, the combination of a frame, a revolvable bowl journaled in the frame, a holding bar, stops carried by the bowl, means for supporting the holding bar on the frame, a latch member pivotally supported on the holding bar in position to be engaged by the stops, a toggle link pivotally connected to the latch member, a holding bar link pivotally connected at one end with the holding bar, a pivot means connecting the other end of the holding bar link with the toggle link, the latter said pivot means being positioned between the toggle link and the point of connection of the holding bar link with the holding bar and in position to engage the holding bar to maintain the latch member in holding position.

5. In a device of the class described, the combination of a draft frame, a revolvable bowl journaled in the frame, a holding bar, stops carried by the bowl, a latch member pivotally supported on the holding bar, a holding stop carried by the holding bar, a linkage system between the latch member and holding stop whereby the holding stop may swing freely in one direction to permit passage of the bowl stops, and means carried by the said linkage to engage the holding bar and maintain the first said latch in position of holding engagement with a bowl stop.

EDWIN WADELTON.